United States Patent
Yang et al.

(10) Patent No.: US 7,598,690 B2
(45) Date of Patent: *Oct. 6, 2009

(54) START-UP CIRCUIT FOR DC FAN

(75) Inventors: Xing-Jun Yang, Shenzhen (CN);
Feng-Long He, Shenzhen (CN);
Yong-Xing You, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 529 days.

This patent is subject to a terminal disclaimer.

(21) Appl. No.: 11/247,343

(22) Filed: Oct. 11, 2005

(65) Prior Publication Data

US 2006/0076912 A1 Apr. 13, 2006

(30) Foreign Application Priority Data

Oct. 8, 2004 (CN) .................. 2004 1 0051831

(51) Int. Cl.
*H02P 25/08* (2006.01)
(52) U.S. Cl. ................... 318/254.1; 318/268
(58) Field of Classification Search ............. 318/268, 318/254.1, 138
See application file for complete search history.

(56) References Cited

U.S. PATENT DOCUMENTS

| | | | | |
|---|---|---|---|---|
| 4,675,583 A * | 6/1987 | Berghammer | ......... | 318/400.01 |
| 5,592,580 A * | 1/1997 | Doherty et al. | ............. | 388/815 |
| 5,694,010 A * | 12/1997 | Oomura et al. | ........ | 318/400.07 |
| 5,942,866 A * | 8/1999 | Hsieh | .......... | 318/268 |
| 6,259,172 B1 * | 7/2001 | Lee | .............. | 307/125 |
| 6,285,146 B1 * | 9/2001 | Harlan | .................. | 318/400.04 |
| 6,538,404 B2 * | 3/2003 | Kato et al. | ............. | 318/400.06 |
| 6,617,709 B2 * | 9/2003 | Yu | .............. | 307/119 |
| 6,650,074 B1 * | 11/2003 | Vyssotski et al. | ...... | 318/400.12 |
| 7,205,733 B2 * | 4/2007 | Xiong et al. | ........... | 318/400.11 |
| 2002/0021102 A1 * | 2/2002 | Kurashina | ................... | 318/685 |
| 2004/0095264 A1 * | 5/2004 | Thomas | ...................... | 341/53 |
| 2004/0164692 A1 * | 8/2004 | Xi | .............................. | 318/268 |

FOREIGN PATENT DOCUMENTS

TW 092215559 8/2004

* cited by examiner

*Primary Examiner*—Bentsu Ro
*Assistant Examiner*—David S Luo
(74) *Attorney, Agent, or Firm*—Zhigang Ma (57) ABSTRACT

A start-up circuit which decreases a start-up current and stabilizes running of a DC fan. The start-up circuit includes a digital-analog converter for convert a digital control signal from a control chip to an analog control signal, a voltage sampling device connected to an output terminal of the digital-analog converter, a comparator, a switching device for controlling start-up of the DC fan, and a feedback device adjusting current passing through the switching device. The comparator includes two input terminals and an output terminal. One input terminal is connected to an output terminal of the voltage sampling device. The switching device is connected to the output terminal of the comparator. An output signal of the switching device is inputted to the other input terminal of the comparator via the feedback device.

18 Claims, 7 Drawing Sheets

START-UP CIRCUIT FOR DC FAN

BACKGROUND OF THE INVENTION

1. Field of the Invention

The present invention relates to a start-up circuit for a direct current (DC) fan, and more particularly to a start-up circuit which has a decreased start-up current and which stabilizes running of a DC fan.

2. General Background

Developments in today's highly information-intensive society have led to remarkable improvements in performances of electronic devices. During operation of many contemporary electronic devices such as central processing units (CPUs), large amounts of heat are produced. Typically, an electric fan is used to facilitate removal of the heat. The fan must run stably, so as to prevent the device from becoming unstable or being damaged. A start-up circuit accompanying the fan is quite important to ensure normal running of the fan.

Figure 5:
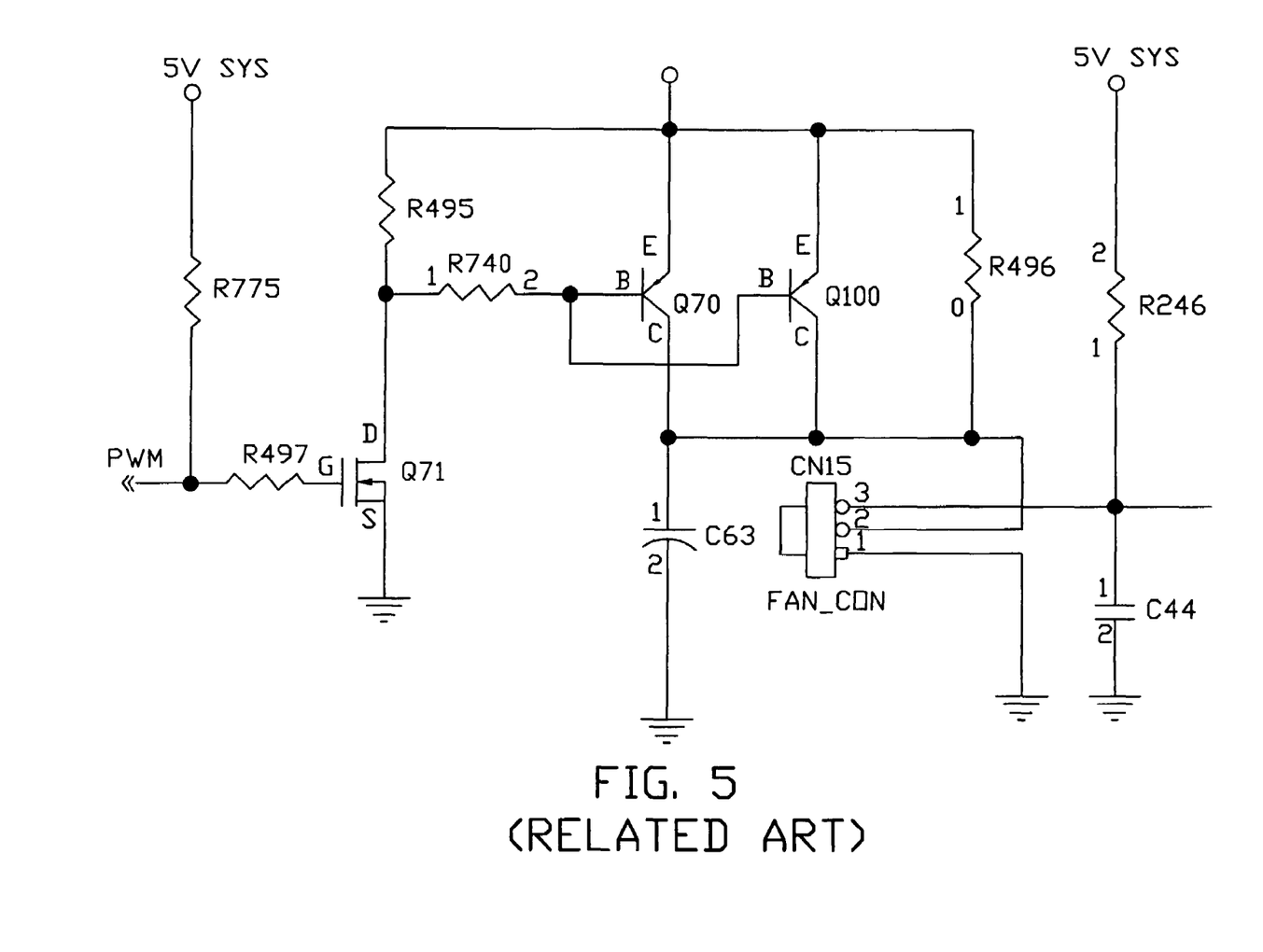
FIG. 5 is a circuit diagram of a conventional start-up circuit for a DC fan.
Figure 6:
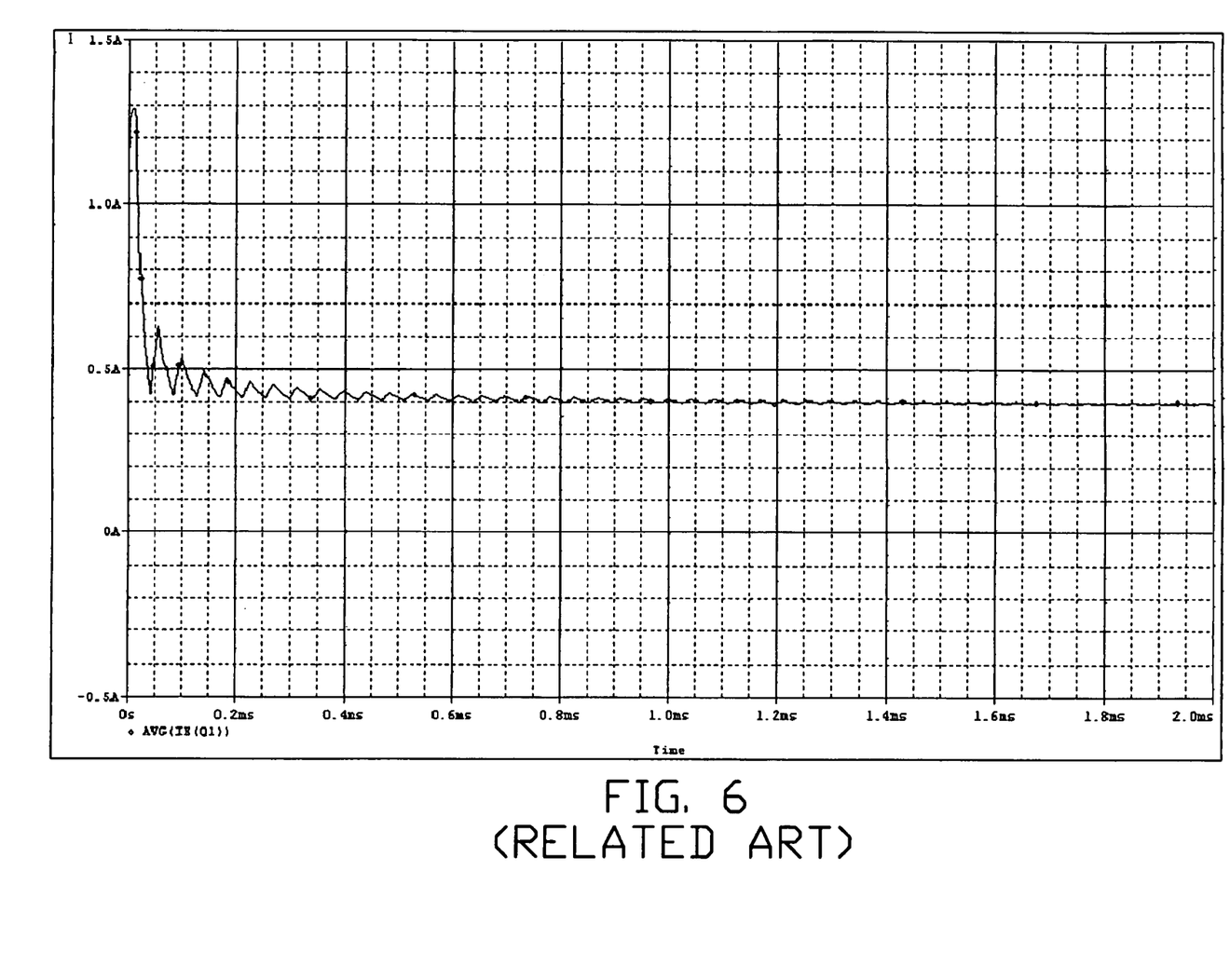
FIG. 6 is a graph of starting current versus time, in respect of transistors of the start-up circuit of FIG. 5.

FIG. 5 shows a conventional start-up circuit of a DC fan. A Pulse-Width Modulation (PWM) signal from a control chip directly drives transistors Q70 and Q100. The transistors Q70 and Q100 directly drive a DC fan. A high capacity electrolytic capacitor C63 is provided for wave filtering. Referring to FIG. 6, when the start-up circuit is started, a large start-up current is generated at that instant. The start-up current is liable to damage or even ruin the transistors Q70 and Q100. In addition, although the high capacity electrolytic capacitor C63 is employed, voltage ripples may still occur. When this happens, the fan may rotate unstably.

Figure 7:
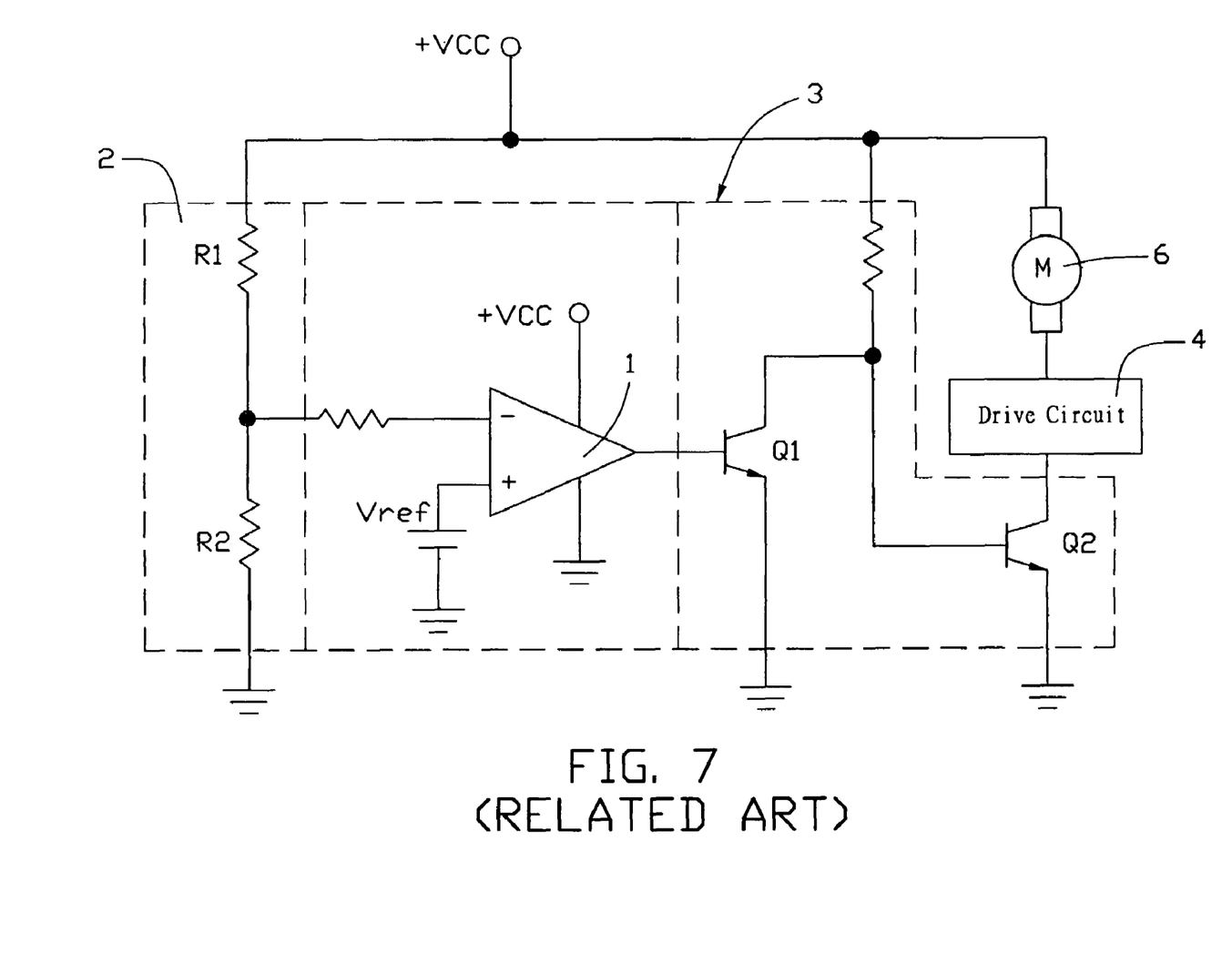
FIG. 7 is a circuit diagram of another conventional start-up circuit for a DC fan.

FIG. 7 represents a start-up voltage control circuit of a DC brushless fan, as disclosed in Taiwan Patent Application No. 092215559. The control circuit includes a comparator 1, a voltage sampling circuit 2, and an on-off control circuit 3. The comparator 1 compares a supply voltage of a supply circuit with a reference voltage that meets with a fan driving voltage specification. The on-off control circuit 3 is connected to an output terminal of the comparator 1, for controlling whether a drive circuit 4 and a fan motor 6 are connected to the supply circuit. The on-off control circuit 3 comprises transistors Q1 and Q2. However, the transistors Q1 and Q2 are directly controlled by the supply circuit. When a starting current passing through the transistors Q1 and Q2 is too large, the transistors Q1 and Q2 are liable to be damaged or even ruined.

What is needed is a start-up circuit which has a decreased start-up current and which can stably run a DC fan.

SUMMARY

A start-up circuit of a DC fan in accordance with a preferred embodiment includes a digital-analog converter for convert a digital control signal from a control chip to an analog control signal, a voltage sampling device connected to an output terminal of the digital-analog converter, a comparator as a voltage stabilizer, a switching device for controlling start-up of the DC fan, and a feedback device adjusting current passing through the switching device. The comparator includes two input terminals and an output terminal. One input terminal is connected to an output terminal of the voltage sampling device. The switching device is connected to the output terminal of the comparator. An output signal of the switching device is inputted to the other input terminal of the comparator via the feedback device.

The digital-analog converter of the star-up circuit converts the digital control signal to the smooth analog control signal to get a linear drive. The linear drive makes working voltage of the DC fan to be zero ripples, which makes the DC fan to rotate evenly and has lower noise. Rotation speed of the DC fan and the PWM control signal are in direct proportion, to prevent a too-low rotation speed and cease of the DC fan. The start-up circuit further includes a buffer connected between the voltage sampling device and the comparator for preventing a large current in a power turn-on instant. The feedback device lowers the current passing through the switching device when the current is too high, therefore the keeping a constant current to even the rotation speed.

Other advantages and novel features will become more apparent from the following detailed description when taken in conjunction with the accompanying drawings, in which:

DETAILED DESCRIPTION OF THE EMBODIMENTS

Figure 1:
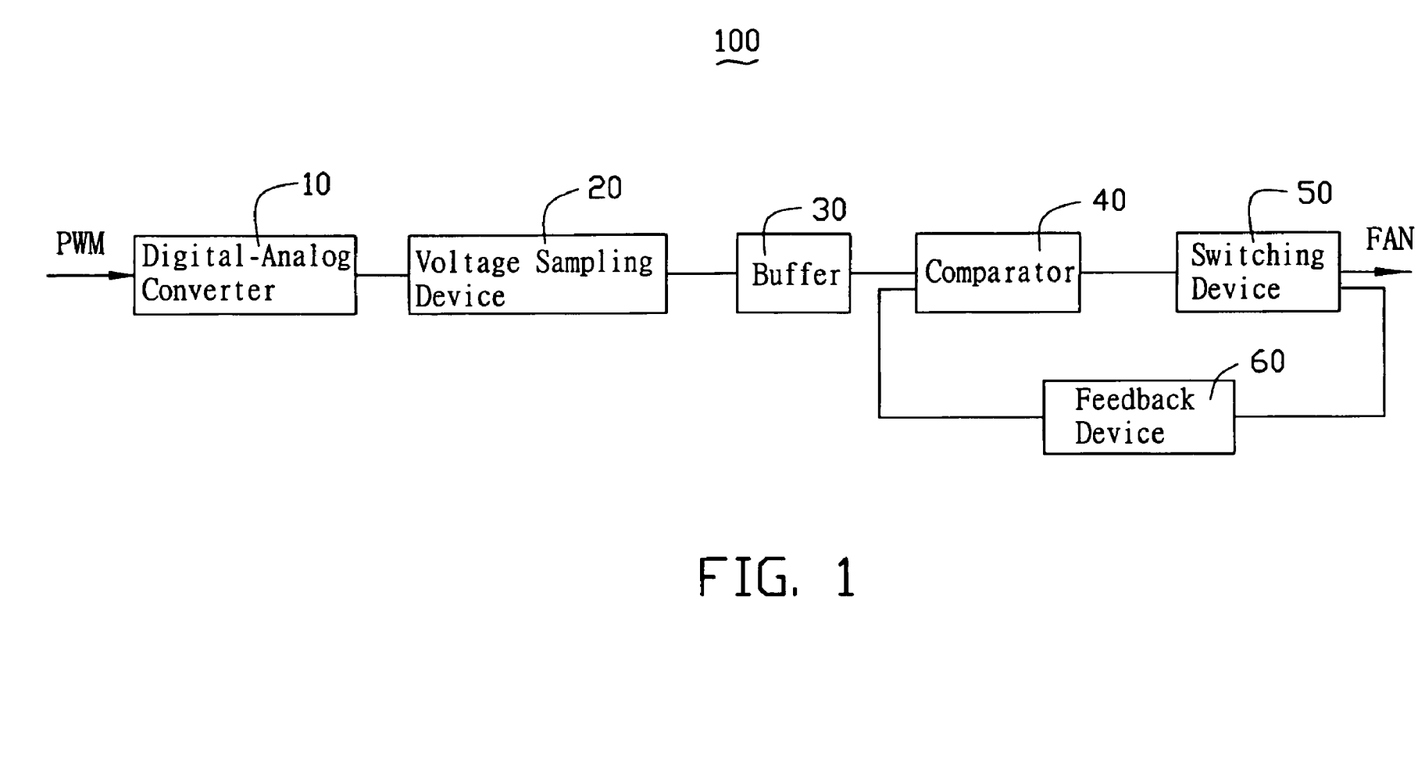
FIG. 1 is a system block diagram of a start-up circuit for a DC fan in accordance with first and second embodiments of the present invention.

Referring to FIG. 1, a system block diagram of a start-up circuit 100 for a DC fan in accordance with first and second embodiments of the present invention is shown. A pulse width modulation (PWM) digital control signal comes from a control chip such as a Super I/O chip (not shown). The PWM digital control signal has a fixed frequency. Generally, a duty cycle of the PWM digital control signal changes according to sensed temperature. If the sensed temperature is increasing, the duty cycle increases, and a rotation speed of the DC fan increases. The start-up circuit 100 includes a digital-analog converter 10, a voltage sampling device 20, a buffer 30, a comparator 40 as a voltage stabilizer, and a switching device 50, which are connected in series. The digital-analog converter 10 converts the PWM digital control signal to a smooth analog control signal. The analog control signal is inputted to an input terminal of the comparator 40 via the voltage sampling device 20 and the buffer 30. An output terminal of the comparator 40 is connected to the switching device 50, to drive the switching device 50 to control current passing through the DC fan. The start-up circuit 100 further includes a feedback device 60 to control the current passing through the switching device 50. An output signal of the switching device 50 is inputted to another input terminal of the comparator 40 via the feedback device 60.

Figure 2:
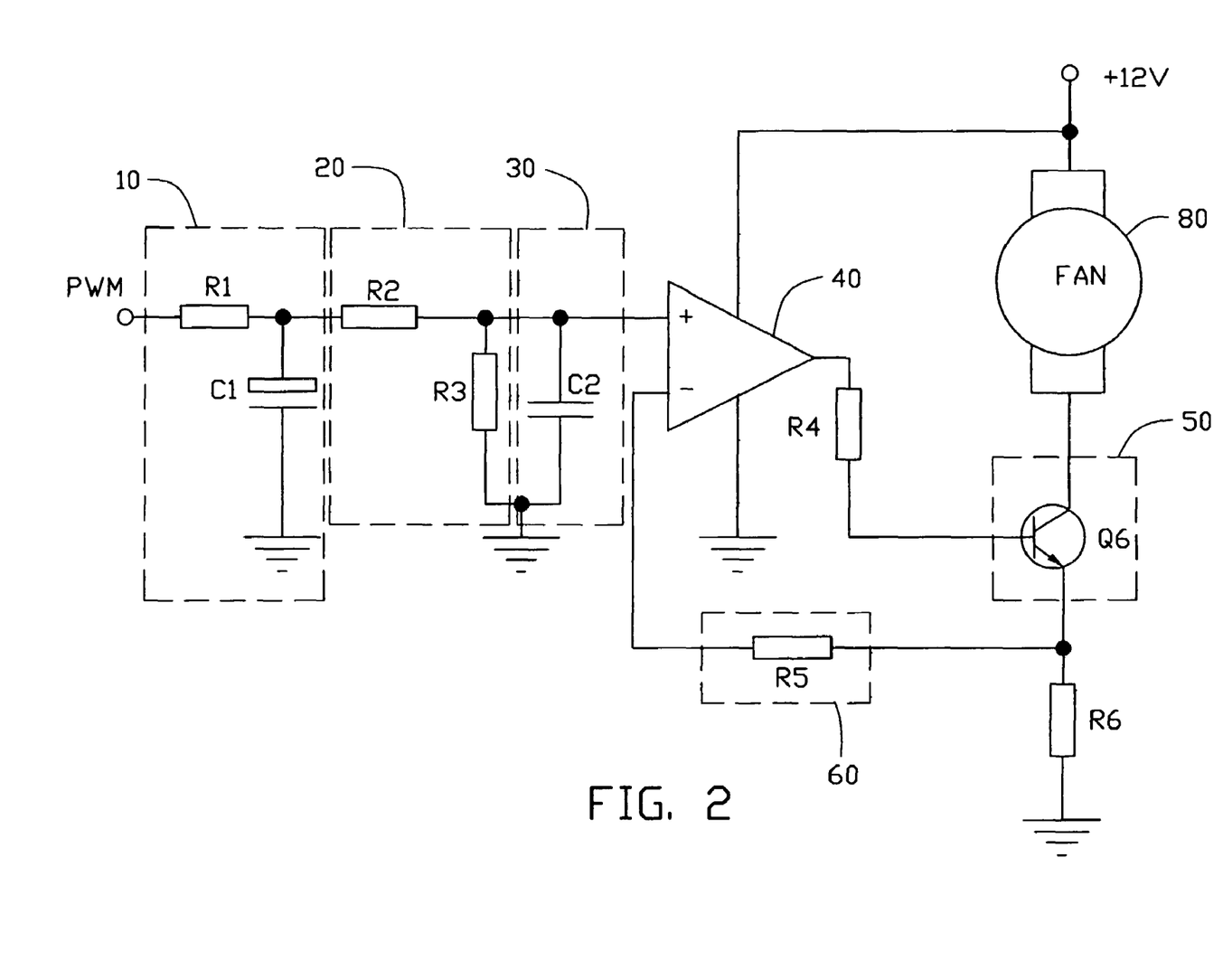
FIG. 2 is a circuit diagram of a start-up circuit for a DC fan in accordance with the first preferred embodiment of the present invention.

Referring also to FIG. 2, this shows the start-up circuit 100 connected with a DC fan 80, in accordance with the first preferred embodiment of the present invention. The digital-analog converter 10 includes an integral circuit that is composed of a resistor R1 and a capacitor C1 connected in series. An input terminal of the resistor R1 receives the PWM digital control signal of the control chip, an output terminal of the resistor R1 is connected to one end of the capacitor C1, and the other end of the capacitor C1 is grounded. The voltage sampling device 20 includes a resistor R2 and a resistor R3 connected in series. Resistances of the resistors R2 and R3 are configured to feed a suitable voltage to the DC fan 80 according to specifications of the DC fan 80. A node between respective ends of the resistors R2 and R3 is connected to a non-inverting input terminal of the comparator 40. The other end of the resistor R2 is connected to a node between the resistor R1 and the capacitor C1. The other end of the resistor R3 is grounded. The buffer 30 includes a capacitor C2. One end of the capacitor C2 is connected to the non-inverting terminal of the comparator 40, and the other end of the capacitor C2 is grounded. The switching device 50 includes a Bipolar Junction Transistor (BJT) Q6. The BJT Q6 has a base, an emitter, and a collector. The base of the BJT Q6 is connected to an output terminal of the comparator 40 via a resistor R4. The collector of the BJT Q6 is connected to the DC fan 80. The emitter of the BJT Q6 is grounded via a resistor R6. The feedback device 60 includes a feedback resistor R5 providing degenerative feedback. The emitter of the BJT Q6 outputs signals to an inverting input terminal of the comparator 40 via the feedback device 60.

Figure 3:
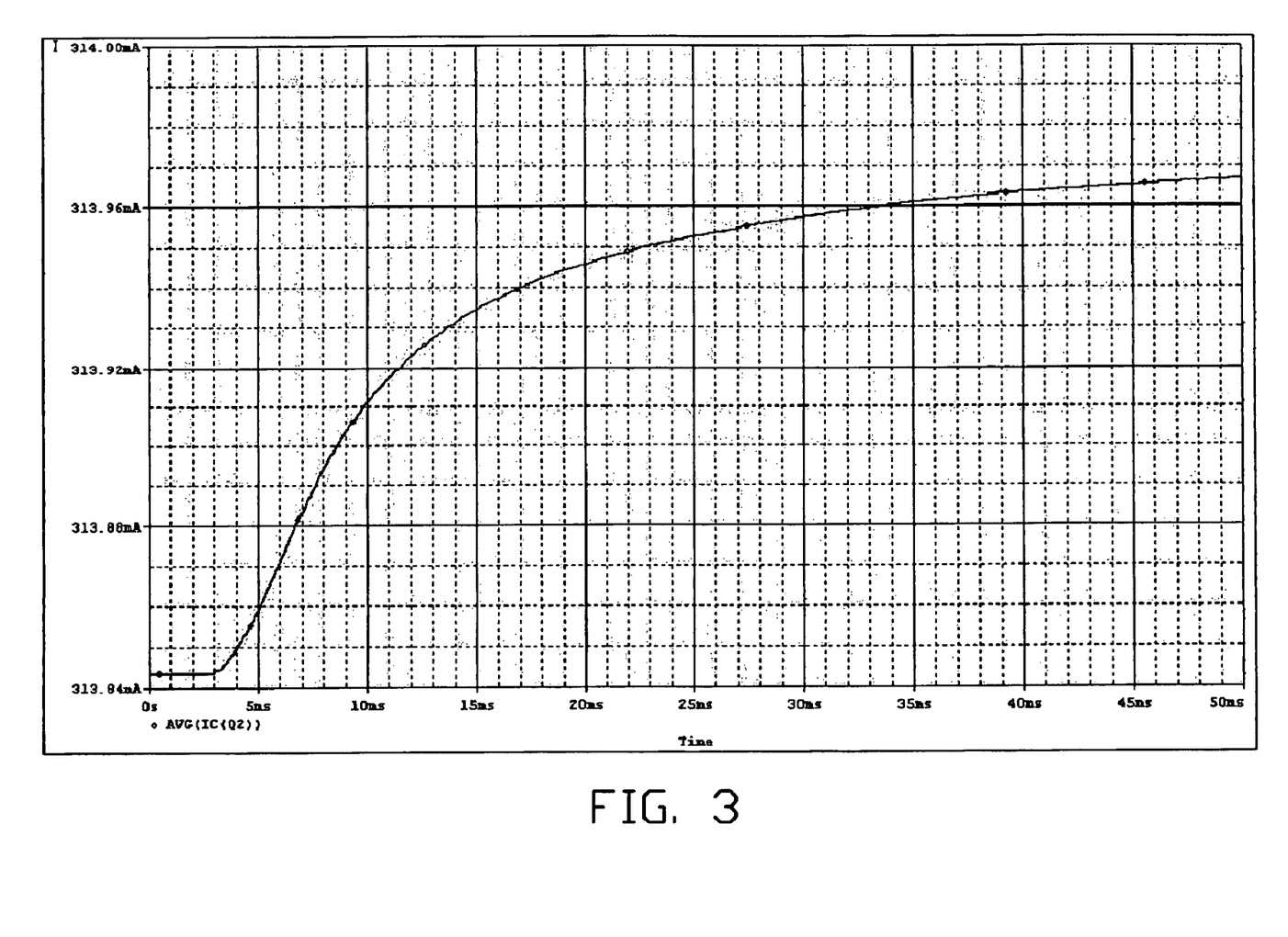
FIG. 3 is a graph of starting current versus time, in respect of transistors of the start-up circuit of FIG. 2.

Referring also to FIG. 3, at the instant power is turned on, the capacitor C2 begins to charge, and a voltage of the non-inverting input terminal of the comparator 40 rises from zero volts. Before the voltage rises from a non-inverting input voltage to an inverting input voltage, an output voltage of the comparator 40 is very low. Current passing through the transistor Q6 is very low, so the transistor Q6 is turned off. The transistor Q6 is thereby protected at the instant of power turn-on. As the charge of the capacitor C2 increases, the non-inverting input voltage of the comparator 40 increases and finally exceeds the inverting input voltage of the comparator 40. The transistor Q6 is thus turned on, and drives the DC fan 80 to work. As the output voltage of the comparator 40 increases, a base current of the transistor Q6 increases. Accordingly, a collector current of the transistor Q6 increases, so as to increase a current of the DC fan 80. Because of the feedback device 60, when the collector current of the transistor Q6 increases, the inverting input voltage of the comparator 40 increases. Accordingly, the non-inverting input voltage of the comparator 40 decreases, and the output voltage of the comparator 40 decreases. As a result, the base current of the transistor Q6 decreases, the collector current of the transistor Q6 decreases, and the current of the DC fan 80 decreases. Therefore, the current of the DC fan 80 is kept stable, so that the DC fan 80 rotates smoothly. In this embodiment, the delay time of the transistor Q6 from turn-off to turn-on is approximately 2 ms.

In the working procedure of the start-up circuit 100, when the PWM digital control signal having an amplitude Vamp and a duty cycle D is applied to the digital-analog converter 10, the voltage $Vc_1$ of the capacitor C1 is:

$$Vc_1 = Vamp * D \quad (1)$$

When the voltage $Vc_1$ is applied to the comparator 40, the non-inverting input voltage V+ is:

$$V_+ = Vc1 * \frac{R3}{R2+R3} = Vamp * D * \frac{R3}{R2+R3} = V_- \quad (2)$$

Then, the current I of the DC fan 80 is:

$$I = \frac{V_-}{R6} = \frac{Vamp * D * R3}{(R2+R3) * R6} = \frac{Vamp * R3}{(R2+R3) * R6} * D = M * D \quad (3)$$

wherein, constant $$M = \frac{Vamp * R3}{(R2+R3) * R6}$$

It can be deduced from formula (3) that the current I of the DC fan 80 and the duty cycle D of the PWM digital control signal are in a linear relationship. That is, the rotation speed of the DC fan 80 is in direct proportion to the duty cycle D of the PWM digital control signal.

In other words, the start-up circuit 100 is linearly driven. In the range of 0~100% of the duty cycle D of the PWM digital control signal, the fan voltage is changed smoothly.

Figure 4:
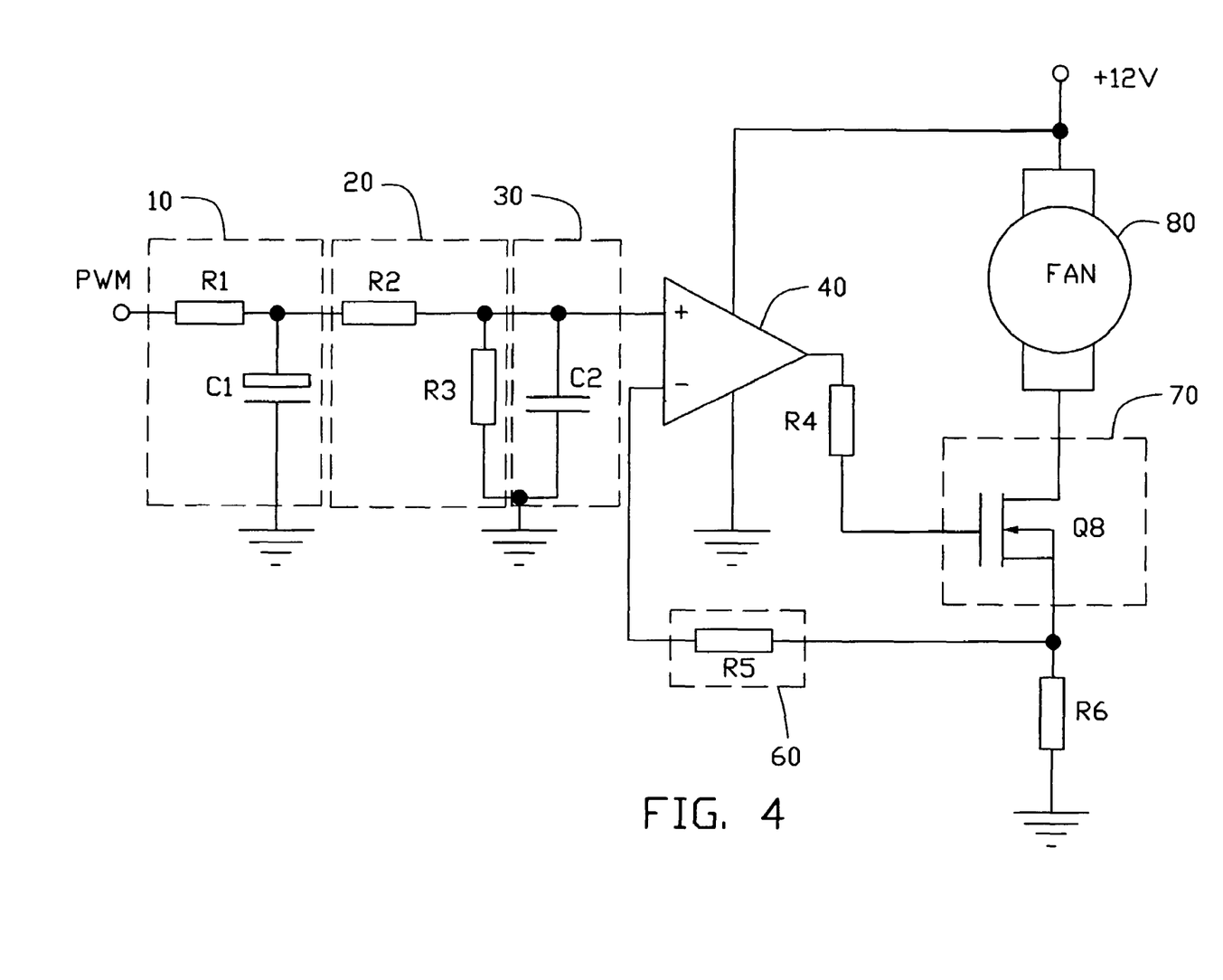
FIG. 4 is a circuit diagram of a start-up circuit for a DC fan in accordance with a second preferred embodiment of the present invention.

FIG. 4 shows a start-up circuit in accordance with the second preferred embodiment of the present invention, and a DC fan 80 connected with the start-up circuit. The start-up circuit of the second preferred embodiment is similar to the start-up circuit 100 of the first preferred embodiment. However, instead of having a switching device 50, the start-up circuit of the second preferred embodiment has a switching device 70. The switching device 70 includes a Metal-Oxide Semiconductor Field Effect Transistor (MOSFET) Q8.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A start-up circuit for a DC (direct current) fan, comprising:
   a digital-analog converter for converting a digital control signal to an analog control signal, the digital-analog converter comprising an output terminal;
   a voltage sampling device connected to the output terminal of the digital-analog converter, the voltage sampling device comprising an output terminal;
   a comparator comprising two input terminals and an output terminal, one of the input terminals being connected to the output terminal of the voltage sampling device;
   a switching device for controlling start-up of the DC fan, the switching device being connected to the output terminal of the comparator; and
   a feedback device connected between an output terminal of the switching device and the other one of the input terminals of the comparator for adjusting a current passing through the switching device for the DC fan, an output signal of the switching device being inputted to the other one of the input terminals of the comparator via the feedback device.

2. The start-up circuit as claimed in claim 1, wherein the digital-analog converter comprises an integral circuit that has a first resistor and a first capacitor connected in series.

3. The start-up circuit as claimed in claim 2, wherein the voltage sampling device comprises a second resistor and a third resistor connected in series, a node between the second and third resistors is connected to said one of the input terminals of the comparator, the second resistor is connected to a node between the first resistor and the first capacitor, and the third resistor is grounded.

4. The start-up circuit as claimed in claim 1, further comprising a buffer connected between the voltage sampling device and the comparator, for preventing a large current flow at the instant of power turn-on of the start-up circuit.

5. The start-up circuit as claimed in claim 4, wherein the buffer comprises a second capacitor, one end of the second capacitor is connected to said one of the input terminals of the comparator, and the other end of the second capacitor is grounded.

6. The start-up circuit as claimed in claim 1, wherein the switching device comprises a Bipolar Junction Transistor (BJT), and the BJT has a base connected to the output terminal of the comparator via a resistor, a collector for connecting to the DC fan, and an emitter grounded via a resistor.

7. The start-up circuit as claimed in claim 6, wherein the feedback device comprises a feedback resistor, and the emitter of the BJT outputs a signal to said other one of the input terminals of the comparator via the feedback resistor.

8. The start-up circuit as claimed in claim 1, wherein the switching device comprises a Metal-Oxide Semiconductor Field Effect Transistor (MOSFET), and the MOSFET has a gate connected to the output terminal of the comparator via a resistor, a drain for connecting to the DC fan, and a source grounded via a resistor.

9. A start-up circuit for a DC (direct current) fan, comprising:
   a digital-analog converter for converting a digital control signal to an analog control signal, the digital-analog converter comprising an output terminal;
   a voltage sampling device connected to the output terminal of the digital-analog converter, the voltage sampling device comprising an output terminal;
   a comparator comprising two input terminals and an output terminal, one of the input terminals being connected to the output terminal of the voltage sampling device;
   a buffer connected between the voltage sampling device and the comparator, for preventing a large current flow at the instant of power turn-on of the start-up circuit; and
   a switching device for controlling start-up of the DC fan, the switching device being connected to the output terminal of the comparator; wherein the switching device comprises a transistor, and the transistor has a first end connected to the output terminal of the comparator via a first resistor, a second end for connecting to the DC fan, and a third end grounded via a second resistor.

10. The start-up circuit as claimed in claim 9, wherein the digital-analog converter comprises an integral circuit that has a first resistor and a first capacitor connected in series, an input end of the first resistor receives the digital control signal, and the first capacitor is grounded.

11. The start-up circuit as claimed in claim 10, wherein the voltage sampling device comprises a second resistor and a third resistor connected in series, a node between the second and third resistors is connected to said one of the input terminals of the comparator, the second resistor is connected to a node between the first resistor and the first capacitor, and the third resistor is grounded.

12. The start-up circuit as claimed in claim 9, wherein the buffer comprises a second capacitor, one end of the second capacitor is connected to said one of the input terminals of the comparator, and the other end of the second capacitor is grounded.

13. The start-up circuit as claimed in claim 9, further comprising a feedback device for automatically adjusting current passing through the transistor, wherein an output signal from the third end of the transistor is inputted to said other one of the input terminals of the comparator via the feedback device.

14. The start-up circuit as claimed in claim 13, wherein the feedback device comprises a feedback resistor.

15. The start-up circuit as claimed in claim 9, wherein the transistor is a Bipolar Junction Transistor (BJT), and the BJT has a base connected to the output terminal of the comparator via the first resistor, a collector for connecting to the DC fan, and an emitter grounded via the second resistor.

16. The start-up circuit as claimed in claim 9, wherein the transistor is a Metal-Oxide Semiconductor Field Effect Transistor (MOSFET), and the MOSFET has a gate connected to the output terminal of the comparator via the first resistor, a drain for connecting to the DC fan, and a source grounded via the second resistor.

17. A start-up circuit for a direct current (DC) fan, comprising:
   means to receive a pulse width modulation (PWM) signal and translate said PWM signal to a control signal capable of being output by said means;
   a buffer electrically connecting with said means for accepting said control signal so as to be electrically chargeable within a predetermined period before further transmitting said control signal;
   a switching device electrically connecting with a direct current (DC) fan so as to be capable of activating said fan; and
   a voltage stabilizer electrically connected between said buffer and said switching device, said voltage stabilizer capable of accepting said control signal from said buffer and a feedback signal from said switching device so as to transmit said control signal to said switching device for controlling said switching device to activate said fan.

18. The start-up circuit as claimed in claim 17, wherein said switching device comprises a selective one of a Bipolar Junction Transistor (BJT) and a Metal-Oxide Semiconductor Field Effect Transistor (MOSFET).

* * * * *

UNITED STATES PATENT AND TRADEMARK OFFICE
CERTIFICATE OF CORRECTION

PATENT NO. : 7,598,690 B2  Page 1 of 1
APPLICATION NO. : 11/247343
DATED : October 6, 2009
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Twenty-eighth Day of September, 2010

David J. Kappos
*Director of the United States Patent and Trademark Office*